US009996855B2

(12) United States Patent
Cochran et al.

(10) Patent No.: US 9,996,855 B2
(45) Date of Patent: *Jun. 12, 2018

(54) METHODS, SYSTEMS AND APPARATUS TO GENERATE MARKET SEGMENTATION DATA WITH ANONYMOUS LOCATION DATA

(71) Applicant: The Nielsen Company (US), LLC, New York, NY (US)

(72) Inventors: Laura Cochran, San Diego, CA (US); David R. Miller, Annandale, VA (US); Jeff Stevens, San Diego, CA (US); Mark Nelson, Rancho Sante Fe, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/438,344

(22) Filed: Feb. 21, 2017

(65) Prior Publication Data

US 2017/0161788 A1    Jun. 8, 2017

Related U.S. Application Data

(63) Continuation of application No. 14/591,205, filed on Jan. 7, 2015, now Pat. No. 9,613,363, which is a (Continued)

(51) Int. Cl.
*G06Q 30/02* (2012.01)

(52) U.S. Cl.
CPC ..... *G06Q 30/0267* (2013.01); *G06Q 30/0204* (2013.01)

(58) Field of Classification Search
CPC .................. G06Q 30/0204; G06Q 30/0267
(Continued)

(56) References Cited

U.S. PATENT DOCUMENTS 4,099,591 A    7/1978   Carr
4,361,851 A    11/1982  Asip et al.
(Continued)

FOREIGN PATENT DOCUMENTS

CN    1776694       5/2006
CN    101040242     9/2007
(Continued)

OTHER PUBLICATIONS

International Searching Authority, "International Preliminary Report on Patentability," issued in connection with International Application No. PCT/FI2010/050548, dated Dec. 28, 2012, 7 pages.
(Continued)

*Primary Examiner* — Michael Neff
(74) *Attorney, Agent, or Firm* — Hanley, Flight & Zimmerman, LLC

(57) ABSTRACT

Methods and apparatus are disclosed to determine a consumer classification segment. A disclosed example method involves generating, with a processor, a list of consumer classification segments based on geographic indicators associated with a mobile device, associating, with the processor, the mobile device with a first consumer classification segment of the list of consumer classification segments if the geographic indicators were retrieved while a first application was executed, and associating, with the processor, the mobile device with a second consumer classification segment of the list of consumer classification segments if the geographic indicators were retrieved while a second application was executed.

20 Claims, 5 Drawing Sheets

Related U.S. Application Data continuation of application No. 13/721,321, filed on Dec. 20, 2012, now Pat. No. 8,954,090, which is a continuation of application No. 12/868,420, filed on Aug. 25, 2010, now Pat. No. 8,340,685.

(58) Field of Classification Search
USPC ..................................................... 455/456.1
See application file for complete search history.

(56) References Cited

U.S. PATENT DOCUMENTS

| | | |
|---|---|---|
| 4,973,952 A | 11/1990 | Malec et al. |
| 4,990,892 A | 2/1991 | Guest et al. |
| 5,014,206 A | 5/1991 | Scribner et al. |
| 5,119,104 A | 6/1992 | Heller |
| 5,214,687 A | 5/1993 | Kansakoski et al. |
| 5,233,642 A | 8/1993 | Renton |
| 5,241,534 A | 8/1993 | Omuro et al. |
| 5,287,266 A | 2/1994 | Malec et al. |
| 5,319,638 A | 6/1994 | Lin |
| 5,345,392 A | 9/1994 | Mito et al. |
| 5,444,745 A | 8/1995 | Ali-Vehmas |
| 5,483,468 A | 1/1996 | Chen et al. |
| 5,497,373 A | 3/1996 | Hulen et al. |
| 5,521,907 A | 5/1996 | Ennis, Jr. et al. |
| 5,603,095 A | 2/1997 | Uola |
| 5,642,353 A | 6/1997 | Roy, III et al. |
| 5,675,510 A | 10/1997 | Coffey et al. |
| 5,692,215 A | 11/1997 | Kutzik et al. |
| 5,799,154 A | 8/1998 | Kuriyan |
| 5,848,396 A | 12/1998 | Gerace |
| 5,859,838 A | 1/1999 | Soliman |
| 5,872,588 A | 2/1999 | Aras et al. |
| 5,978,657 A | 11/1999 | Suzuki |
| 5,987,306 A | 11/1999 | Nilsen et al. |
| 5,991,735 A | 11/1999 | Gerace |
| 5,991,806 A | 11/1999 | McHann, Jr. |
| 5,999,908 A | 12/1999 | Abelow |
| 6,091,956 A | 7/2000 | Hollenberg |
| 6,108,637 A | 8/2000 | Blumenau |
| 6,115,680 A | 9/2000 | Coffee et al. |
| 6,138,147 A | 10/2000 | Weaver et al. |
| 6,144,944 A | 11/2000 | Kurtzman, II et al. |
| 6,226,272 B1 | 5/2001 | Okano et al. |
| 6,301,471 B1 | 10/2001 | Dahm et al. |
| 6,353,929 B1 | 3/2002 | Houston |
| 6,397,256 B1 | 5/2002 | Chan et al. |
| 6,405,245 B1 | 6/2002 | Burson et al. |
| 6,405,251 B1 | 6/2002 | Bullard et al. |
| 6,442,748 B1 | 8/2002 | Bowman-Amuah |
| 6,470,386 B1 | 10/2002 | Combar et al. |
| 6,477,580 B1 | 11/2002 | Bowman-Amuah |
| 6,480,497 B1 | 11/2002 | Flammer, III et al. |
| 6,516,189 B1 | 2/2003 | Frangione et al. |
| 6,526,413 B2 | 2/2003 | Schwitters et al. |
| 6,581,025 B2 | 6/2003 | Lehman |
| 6,587,835 B1 | 7/2003 | Treyz et al. |
| 6,606,605 B1 | 8/2003 | Kolls |
| 6,647,269 B2 | 11/2003 | Hendrey et al. |
| 6,697,944 B1 | 2/2004 | Jones et al. |
| 6,745,011 B1 | 6/2004 | Hendrickson et al. |
| 6,754,470 B2 | 6/2004 | Hendrickson et al. |
| 6,757,543 B2 | 6/2004 | Moran et al. |
| 6,763,458 B1 | 7/2004 | Watanabe et al. |
| 6,792,457 B1 | 9/2004 | Zhang et al. |
| 6,807,515 B2 | 10/2004 | Vogel et al. |
| 6,816,886 B2 | 11/2004 | Elvanoglu et al. |
| 6,834,308 B1 | 12/2004 | Ikezoye et al. |
| 6,837,436 B2 | 1/2005 | Swartz et al. |
| 6,840,861 B2 | 1/2005 | Jordan et al. |
| 6,879,960 B2 | 4/2005 | Nascenzi et al. |
| 6,883,168 B1 | 4/2005 | James et al. |
| 6,912,507 B1 | 6/2005 | Phillips et al. |
| 6,920,550 B2 | 7/2005 | Des Li |
| 6,928,280 B1 | 8/2005 | Xanthos et al. |
| 6,968,178 B2 | 11/2005 | Pradhan et al. |
| 6,970,131 B2 | 11/2005 | Percy et al. |
| 6,973,491 B1 | 12/2005 | Staveley et al. |
| 6,999,715 B2 | 2/2006 | Hayter et al. |
| 7,010,107 B1 | 3/2006 | Lee et al. |
| 7,013,136 B2 | 3/2006 | Frangione et al. |
| 7,072,640 B2 | 7/2006 | Bernhart |
| 7,093,243 B2 | 8/2006 | Bailey et al. |
| 7,127,261 B2 | 10/2006 | Van Erlach |
| 7,149,549 B1 | 12/2006 | Ortiz et al. |
| 7,155,210 B2 | 12/2006 | Benson |
| 7,171,157 B2 | 1/2007 | Lee |
| 7,181,519 B2 | 2/2007 | Pillai et al. |
| 7,194,758 B1 | 3/2007 | Waki et al. |
| 7,206,647 B2 | 4/2007 | Kumar |
| 7,209,473 B1 | 4/2007 | Mohaban et al. |
| 7,227,498 B2 | 6/2007 | Soliman |
| 7,319,847 B2 | 1/2008 | Xanthos et al. |
| 7,320,070 B2 | 1/2008 | Baum |
| 7,356,590 B2 | 4/2008 | Wilson et al. |
| 7,392,310 B2 | 6/2008 | Motoyama et al. |
| 7,426,717 B1 | 9/2008 | Schang et al. |
| 7,441,246 B2 | 10/2008 | Auerbach et al. |
| 7,474,645 B2 | 1/2009 | Lundin |
| 7,478,099 B1 | 1/2009 | Gandhi et al. |
| 7,479,899 B2 | 1/2009 | Horstemeyer |
| 7,504,966 B2 | 3/2009 | Horstemeyer |
| 7,523,191 B1 | 4/2009 | Thomas et al. |
| 7,548,915 B2 | 6/2009 | Ramer et al. |
| 7,551,922 B2 | 6/2009 | Roskowski et al. |
| 7,555,571 B1 | 6/2009 | Skinner |
| 7,561,069 B2 | 7/2009 | Horstemeyer |
| 7,562,367 B1 | 7/2009 | Arad |
| 7,609,650 B2 | 10/2009 | Roskowski et al. |
| 7,623,823 B2 | 11/2009 | Zito et al. |
| 7,627,872 B2 | 12/2009 | Hebeler et al. |
| 7,680,802 B2 | 3/2010 | Kato |
| 7,689,521 B2 | 3/2010 | Nodelman et al. |
| 7,693,817 B2 | 4/2010 | Dumais et al. |
| 7,733,799 B2 | 6/2010 | Kalliola et al. |
| 7,742,762 B1 | 6/2010 | Biere et al. |
| 7,751,385 B2 | 7/2010 | Monk et al. |
| 7,756,829 B2 | 7/2010 | Bhanote |
| 7,769,633 B2 | 8/2010 | Jokinen et al. |
| 7,861,225 B2 | 12/2010 | Lee |
| 7,899,915 B2 | 3/2011 | Reisman |
| 7,949,677 B2 | 5/2011 | Croft et al. |
| 7,954,150 B2 | 5/2011 | Croft et al. |
| 8,010,679 B2 | 8/2011 | Low et al. |
| 8,014,726 B1 | 9/2011 | Petersen et al. |
| 8,051,180 B2 | 11/2011 | Mazzaferri et al. |
| 8,073,565 B2 | 12/2011 | Johnson |
| 8,161,172 B2 | 4/2012 | Reisman |
| 8,185,351 B2 | 5/2012 | Crystal et al. |
| 8,214,429 B2 | 7/2012 | Chidel et al. |
| 8,260,252 B2 | 9/2012 | Agarwal |
| 8,291,453 B2 | 10/2012 | Boortz |
| 8,321,556 B1 | 11/2012 | Chatterjee et al. |
| 8,340,685 B2 | 12/2012 | Cochran et al. |
| 8,363,650 B2 | 1/2013 | Rao et al. |
| 8,489,669 B2 | 7/2013 | Johnson |
| 8,538,343 B2 | 9/2013 | Petersen et al. |
| 8,549,133 B2 | 10/2013 | Vaver |
| 8,812,012 B2 | 8/2014 | Besehanic et al. |
| 8,954,090 B2 | 2/2015 | Cochran et al. |
| 9,008,586 B2 | 4/2015 | Petersen et al. |
| 9,148,458 B2 | 9/2015 | Verkasalo |
| 9,203,642 B2 | 12/2015 | Chatterjee et al. |
| 9,613,363 B2 | 4/2017 | Cochran et al. |
| 2001/0028301 A1 | 10/2001 | Geiger et al. |
| 2001/0047291 A1 | 11/2001 | Garahi et al. |
| 2002/0002504 A1 | 1/2002 | Engel et al. |
| 2002/0025795 A1 | 2/2002 | Sharon et al. |
| 2002/0046090 A1 | 4/2002 | Stewart |
| 2002/0069037 A1 | 6/2002 | Hendrickson et al. |
| 2002/0072966 A1 | 6/2002 | Elderding et al. |
| 2002/0112048 A1 | 8/2002 | Gruyer et al. |
| 2002/0160758 A1 | 10/2002 | Pradhan et al. |
| 2002/0186818 A1 | 12/2002 | Arnaud et al. |

(56) References Cited

U.S. PATENT DOCUMENTS

| | | |
|---|---|---|
| 2003/0054757 A1 | 3/2003 | Kolessar et al. |
| 2003/0115586 A1 | 6/2003 | Lejouan et al. |
| 2003/0149743 A1 | 8/2003 | Baluja et al. |
| 2003/0177488 A1 | 9/2003 | Smith et al. |
| 2003/0182567 A1 | 9/2003 | Barton et al. |
| 2004/0122939 A1 | 6/2004 | Perkins |
| 2004/0133672 A1 | 7/2004 | Bhattacharya et al. |
| 2004/0243587 A1 | 12/2004 | Nuyens et al. |
| 2004/0260470 A1 | 12/2004 | Rast |
| 2004/0267694 A1 | 12/2004 | Sakai et al. |
| 2005/0136903 A1 | 6/2005 | Kashima et al. |
| 2005/0144632 A1 | 6/2005 | Mears et al. |
| 2005/0155019 A1 | 7/2005 | Levine et al. |
| 2005/0216509 A1 | 9/2005 | Kolessar et al. |
| 2005/0216844 A1 | 9/2005 | Error et al. |
| 2006/0004627 A1 | 1/2006 | Baluja |
| 2006/0019723 A1 | 1/2006 | Vorenkamp et al. |
| 2006/0129972 A1 | 6/2006 | Tyburski et al. |
| 2006/0184625 A1 | 8/2006 | Nordvik et al. |
| 2006/0218533 A1 | 9/2006 | Koduru et al. |
| 2006/0270401 A1 | 11/2006 | Frangione et al. |
| 2006/0294225 A1 | 12/2006 | Grecco et al. |
| 2007/0011040 A1 | 1/2007 | Wright et al. |
| 2007/0038516 A1 | 2/2007 | Apple et al. |
| 2007/0112739 A1 | 5/2007 | Burns et al. |
| 2007/0150599 A1 | 6/2007 | Neogi et al. |
| 2007/0260475 A1 | 11/2007 | Bhanote |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0002677 A1 | 1/2008 | Bugenhagen et al. |
| 2008/0076506 A1 | 3/2008 | Nguyen et al. |
| 2008/0101552 A1 | 5/2008 | Khan et al. |
| 2008/0109295 A1 | 5/2008 | McConochie et al. |
| 2008/0126420 A1 | 5/2008 | Wright et al. |
| 2008/0140479 A1 | 6/2008 | Mello et al. |
| 2008/0189411 A1 | 8/2008 | Motoyama et al. |
| 2008/0215428 A1* | 9/2008 | Ramer .................. G06Q 30/02 705/14.53 |
| 2008/0243822 A1 | 10/2008 | Campbell et al. |
| 2009/0019182 A1 | 1/2009 | Riise et al. |
| 2009/0132559 A1 | 5/2009 | Chamberlain et al. |
| 2009/0138447 A1 | 5/2009 | Kalavade |
| 2009/0138593 A1 | 5/2009 | Kalavade |
| 2009/0187463 A1 | 7/2009 | Dacosta |
| 2009/0187939 A1 | 7/2009 | Lajoie |
| 2009/0262919 A1 | 10/2009 | Schoenberg |
| 2009/0307263 A1 | 12/2009 | Skibiski et al. |
| 2010/0004997 A1 | 1/2010 | Mehta et al. |
| 2010/0030785 A1 | 2/2010 | Wilson et al. |
| 2010/0079336 A1 | 4/2010 | Skibiski et al. |
| 2010/0082301 A1 | 4/2010 | Skibiski et al. |
| 2010/0100419 A1 | 4/2010 | Natoli et al. |
| 2010/0125657 A1 | 5/2010 | Dowling et al. |
| 2010/0151816 A1 | 6/2010 | Besehanic et al. |
| 2010/0205220 A1 | 8/2010 | Hart et al. |
| 2010/0205301 A1 | 8/2010 | Ansari et al. |
| 2010/0211996 A1 | 8/2010 | McGeehan et al. |
| 2010/0262461 A1 | 10/2010 | Bohannon |
| 2010/0279665 A1* | 11/2010 | Hardin .................. G06Q 30/02 455/414.1 |
| 2011/0035284 A1 | 2/2011 | Moshfeghi |
| 2011/0087975 A1 | 4/2011 | Karsten |
| 2011/0153423 A1 | 6/2011 | Elvekrog et al. |
| 2011/0314084 A1 | 12/2011 | Saretto et al. |
| 2011/0321035 A1 | 12/2011 | Petersen et al. |
| 2012/0036034 A1 | 2/2012 | Golden et al. |
| 2012/0052871 A1 | 3/2012 | Cochran et al. |
| 2012/0102169 A1 | 4/2012 | Yu et al. |
| 2012/0121043 A1 | 5/2012 | Wambacq |
| 2013/0094399 A1 | 4/2013 | Chatterjee et al. |
| 2013/0103764 A1 | 4/2013 | Verkasalo |
| 2013/0110634 A1 | 5/2013 | Cochran et al. |
| 2014/0019203 A1 | 1/2014 | Petersen et al. |
| 2014/0237595 A1 | 8/2014 | Sridhara et al. |
| 2014/0358640 A1 | 12/2014 | Besehanic et al. |
| 2015/0127427 A1 | 5/2015 | Cochran et al. |

FOREIGN PATENT DOCUMENTS

| | | |
|---|---|---|
| CN | 101124578 | 2/2008 |
| EP | 0849909 | 6/1998 |
| EP | 2204766 | 7/2010 |
| JP | H11259422 | 9/1999 |
| JP | 2000222314 | 8/2000 |
| JP | 2001056805 | 2/2001 |
| JP | 2001103086 | 4/2001 |
| JP | 2005148289 | 6/2005 |
| JP | 2006012144 | 1/2006 |
| JP | 2007249306 | 9/2007 |
| JP | 2009245019 | 10/2009 |
| JP | 2009251743 | 10/2009 |
| WO | 9826541 | 6/1998 |
| WO | 9843455 | 10/1998 |
| WO | 0079449 | 12/2000 |
| WO | 0154034 | 7/2001 |
| WO | 0217612 | 2/2002 |
| WO | 0219625 | 3/2002 |
| WO | 02073885 | 9/2002 |
| WO | 02098029 | 12/2002 |
| WO | 03021463 | 3/2003 |
| WO | 2006040740 | 4/2006 |
| WO | 2006098414 | 9/2006 |
| WO | 2008118119 | 10/2008 |
| WO | 2009091606 | 7/2009 |
| WO | 2009094397 | 7/2009 |
| WO | 2010019925 | 2/2010 |

OTHER PUBLICATIONS

International Searching Authority, "International Search Report and Written Opinion," issued in connection with International Application No. PCT/FI2010/050548, dated Mar. 15, 2011, 10 pages.

IP Australia, "Examination Report No. 1," issued in connection with Australian Patent Application No. 2010355789, dated Jul. 22, 2014, 3 pages.

Japan Patent Office, "Notice of Reasons for Rejection," issued in connection with Japanese Patent Application No. P2013-515934, dated Sep. 8, 2015, 10 pages.

Japan Patent Office, "Notice of Reasons for Rejection," issued in connection with Japanese Patent Application No. P2013-515934, dated Feb. 18, 2014, 17 pages.

Japan Patent Office, "Notice of Reasons for Rejection," issued in connection with Japanese Patent Application No. P2013-515934, dated Nov. 4, 2014, 5 pages.

State Intellectual Property Office of the People's Republic of China, "Notification of the First Office Action," issued in connection with Chinese Patent Application No. 201080068453.8, dated Mar. 20, 2015, 5 pages.

United States Patent and Trademark Office, "Non-Final Office Action," issued in connection with U.S. Appl. No. 14/462,190, dated Feb. 2, 2016, 17 pages.

United States Patent and Trademark Office, "Non-Final Office Action," issued in connection with U.S. Appl. No. 14/852,255 dated Dec. 18, 2015, 6 pages.

Korea Intellectual Property Office, "Notice of Rejection," issued in connection with Korean Patent Application No. 10-2013-7001922, dated Feb. 18, 2016, 4 pages.

European Patent Office, "Communication Pursuant to Article 94(3) EPC," issued in connection with European Patent Application No. 09015497.2, dated Feb. 25, 2016, 7 pages.

Balakrishnan et al., "A Comparison of Mechanisms for Improving TCP Performance over Wireless Links," ACM SIGCOMM '96, Stanford, CA, Aug. 1996, 14 pages.

International Searching Authority, "International Search Report and Written Opinion," issued in connection with International Application No. PCT/US2008/056282, dated Aug. 21, 2008, 10 pages.

(56) References Cited

OTHER PUBLICATIONS

International Searching Authority, "International Search Report and Written Opinion," issued in connection with International Application No. PCT/US2007/080235, dated Aug. 25, 2008, 10 pages.
International Searching Authority, "International Preliminary Report on Patentability," issued in connection with Internatioanl Application No. PCT/US2007/080235, dated Apr. 7, 2009, 7 pages.
Jain et al. "Congestion Avoidance in Computer Networks with a Connectionless Network Layer," Digital Equipment Corporation, 1988, Version Jun. 1, 1997, 21 pages.
Ko, "Automatic Call Generation and Analysis-Network Testing and Cellularsurvey Tools," Making Life Easier—Network Design and Management Tools, Digest No. 1996/217, Oct. 10, 1996, Abstract Only, 1 page.
United States Patent and Trademark Office, "Final Office Action," issued in connection with U.S. Appl. No. 11/825,933, dated Jun. 23, 2011, 7 pages.
United States Patent and Trademark Office, "Non-Final Office Action," issued in connection with U.S. Appl. No. 11/825,933, dated Nov. 15, 2010, 7 pages.
United States Patent and Trademark Office, "Non-Final Office Action," issued in connection with U.S. Appl. No. 11/825,933, dated Mar. 22, 2012, 5 pages.
United States Patent and Trademark Office, "Notice of Allowance," issued in connection with U.S. Appl. No. 11/825,933, dated Jan. 19, 2012, 5 pages.
United States Patent and Trademark Office, "Notice of Allowance," issued in connection with U.S. Appl. No. 11/825,933, dated Jul. 30, 2012, 7 pages.
United States Patent and Trademark Office, "Requirement for Restriction/Election," issued in connection with U.S. Appl. No. 11/825,933, dated Sep. 2, 2010, 6 pages.
United States Patent and Trademark Office, "Non-Final Office Action," issued in connection with U.S. Appl. No. 13/685,689 dated Apr. 2, 2015, 11 pages.
United States Patent and Trademark Office, "Notice of Allowance," issued in connection with U.S. Appl. No. 13/685,689 dated Aug. 18, 2015, 5 pages.
Vucetic et al., "Network Mangement Applications for Wirelss Local Loop," Electrotechnical Conference, vol. 2, May 1998, 5 pages.
Battelle Transportation Division, "Global Positioning Systems for Personal Travel Surveys—Lexington Area Travel Data Collection Test," Final Report to Office of Highway Information Management (HPM-40), Office of Technology Application (HTA-1), Federal Highway Administration, Sep. 1997, 92 pages.
Canadian Intellectual Property Office, "Examiner's Report," issued in connection with Canadian Patent Application No. 2,420,238, dated Aug. 23, 2010, 2 pages.
Canadian Intellectual Property Office, "Examiner's Report," issued in connection with Canadian Patent Application No. 2,420,238, dated Feb. 8, 2010, 2 pages.
Canadian Intellectual Property Office, "Examiner's Report," issued in connection with Canadian Patent Application No. 2,420,238, dated Mar. 24, 2009, 4 pages.
European Patent Office, "Communication Pursuant to Article 96(2) EPC," issued in connection with European Patent Application No. 01968369.7, dated Feb. 24, 2006, 3 pages.
European Patent Office, "Communication Pursuant to Article 96(2) EPC," issued in connection with European Patent Application No. 01968369.7, dated Oct. 16, 2006, 5 pages.
European Patent Office, "Communication Pursuant to Article 94(3) EPC," issued in connection with European Patent Application No. 01968369.7, dated May 9, 2008, 4 pages.
European Patent Office, "Communication Pursuant to Article 94(3) EPC," issued in connection with European Patent Application No. 01968369.7, dated Mar. 9, 2011, 5 pages.
European Patent Office, "Communication Pursuant to Article 94(3) EPC," issued in connection with European Patent Application No. 01968369.7, dated Mar. 28, 2012, 4 pages.
European Patent Office, "Summons to Attend Oral Proceedings Pursuant to Rule 115(1) EPC," issued in connection with European Patent Application No. 01968369.7, dated Mar. 20, 2015, 7 pages.
European Patent Office, "European Search Report," issued in connection with European Patent Application No. 10012853.7, dated Mar. 17, 2011, 5 pages.
European Patent Office, "Communication Pursuant to Article 94(3) EPC," issued in connection with European Patent Application No. 10012853.7, dated May 21, 2012, 3 pages.
European Patent Office, "Communication Pursuant to Article 94(3) EPC," issued in connection with European Patent Application No. 10012853.7, dated Mar. 16, 2015, 4 pages.
Hilbert et al., "An Approach to Large-Scale Collection of Application Usage Data Over the Internet," Software Engineering, 1998, Proceedings of the 1998 International Conference, Kyoto, Japan, Apr. 10, 1998, 10 pages.
International Preliminary Examining Authority, "International Preliminary Examination Report," issued in connection with International Patent Application No. PCT/US2001/027235, completed Jan. 25, 2004, 4 pages.
International Searching Authority, "International Search Report," issued in connection with International Patent Application No. PCT/US2001/027235, dated Jul. 18, 2002, 3 pages.
International Searching Authority, "International Search Report," issued in connection with International Patent Application No. PCT/US2002/027631, dated Dec. 9, 2002, 3 pages.
IP Australia, "Patent Examination Report No. 1," issued in connection with Australian Patent Application No. 2008207615, dated Jun. 3, 2010, 2 pages.
IP Australia, "Patent Examination Report No. 1," issued in connection with Australian Patent Application No. 2002332740, dated Apr. 23, 2007, 2 pages.
IP Australia, "Examination Report No. 1," issued in connection with Australian Patent Application No. 2011203048, dated Mar. 20, 2013, 5 pages.
IP Australia, "Patent Examination Report No. 2," issued in connection with Australian Patent Application No. 2011203048, dated May 30, 2014, 3 pages.
IP Australia, "Patent Examination Report No. 1," issued in connection with Australian Patent Application No. 2013203793, dated May 16, 2014, 4 pages.
Lettieri et al., "Advances in Wireless Terminals," IEEE Personal Communications, IEEE Communications Society, US, vol. 6, No. 1, Feb. 1, 1999, 14 pages.
State Intellectual Property Office of the People's Republic of China, "Notification of the First Office Action," issued in connection with Chinese Patent Application No. 01816436.6, dated Dec. 9, 2005, 7 pages.
State Intellectual Property Office of the People's Republic of China, "Notification of the First Office Action," issued in connection with Chinese Patent Application No. 200910145321.x, dated Nov. 16, 2011, 6 pages.
State Intellectual Property Office of the People's Republic of China, "Second Office Action," issued in connection with Chinese Patent Application No. 201080068453.8, dated Jan. 6, 2016, 6 pages.
United States Patent and Trademark Office, "Non-Final Office Action," issued in connection with U.S. Appl. No. 09/944,843, dated Aug. 23, 2003, 10 pages.
United States Patent and Trademark Office, "Notice of Allowance," issued in connection with U.S. Appl. No. 09/944,843, dated Mar. 8, 2004, 7 pages.
Woo et al, "Providing Internet Services to Mobile Phones: A Case Study with Email," Personal, Indoor and Mobile Radio Communications, 1998, The Ninth IEEE International Symposium, Boston, MA, vol. 1, Sep. 8, 1998, Abstract Only, 2 pages.
IP Australia, "Examination Report No. 2," issued in connection with Australian Patent Application No. 2010355789, dated Mar. 9, 2016, 2 pages.
European Patent Office, "Extended European Search Report," issued in connection with European Patent Application No. 10853568.3, dated Jun. 1, 2016, 7 pages.

(56) References Cited

OTHER PUBLICATIONS

State Intellectual Property Office of the People's Republic of China, "Notice of Allowance," issued in connection with Chinese Patent Application No. 201080068453.8, dated Apr. 6, 2016, 2 pages.
United States Patent and Trademark Office, "Notice of Allowance," issued in connection with U.S. Appl. No. 14/852,255, dated May 18, 2016, 31 pages.
IP Australia, "Patent Examination Report No. 3," issued in connection with Australian Patent Application No. 2010355789, dated Apr. 12, 2016, 2 pages.
United States Patent and Trademark Office, "Notice of Allowance," issued in connection with U.S. Appl. No. 13/806,820 dated May 12, 2015, 15 pages.
European Patent Office, "Office Communication," issued in connection with European Patent Application Serial No. 09015497.2, dated Feb. 17, 2011, 1 page.
European Patent Office, "European Search Report," issued in connection with European Patent Application No. 09015497.2, dated Apr. 8, 2010, 6 pages.
United States Patent and Trademark Office, "Non-Final Office Action," issued in connection with U.S. Appl. No. 12/336,338, dated Sep. 24, 2012, 19 pages.
United States Patent and Trademark Office, "Notice of Panel Decision from Pre-Appeal Brief Review," issued in connection with U.S. Appl. No. 12/336,338, dated Apr. 6, 2012, 2 pages.
United States Patent and Trademark Office, "Final Office Action," issued in connection with U.S. Appl. No. 12/336,338, dated Nov. 18, 2011, 19 pages.
United States Patent and Trademark Office, "Non-Final Office Action," issued in connection with U.S. Appl. No. 12/336,338, dated Jun. 21, 2011, 15 pages.
Claritas, "Prizm NE Methodology Summary," Claritas, Inc., 2004, retrieved from <http://www.tetrad.com/pub/prices/PRIZMNE_Methodology.pdf>, retrieved on May 3, 2011, 7 pages.
Claritas, "Prizm NE Segments," Claritas, Inc., retrieved from <http://www.tetrad.com/pub/documents/pnesegments.pdf>, retrieved on May 3, 2011, 3 pages.
United States Patent and Trademark Office, "Notice of Allowance," issued in connection with U.S. Appl. No. 12/868,420, dated Aug. 27, 2012, 12 pages.
United States Patent and Trademark Office, "Non-Final Office Action," issued in connection with U.S. Appl. No. 12/868,420, dated Dec. 9, 2011, 7 pages.
United States Patent and Trademark Office, "Notice of Allowance," issued in connection with U.S. Appl. No. 09/654,486, dated Feb. 3, 2004, 5 pages.
United States Patent and Trademark Office, "Non-Final Office Action," issued in connection with U.S. Appl. No. 09/654,486, dated May 27, 2003, 11 pages.
United States Patent and Trademark Office, "Final Office Action," issued in connection with U.S. Appl. No. 12/336,338, dated May 10, 2013, 23 pages.
United States Patent and Trademark Office, "Non-Final Office Action," issued in connection with U.S. Appl. No. 12/336,338, dated Nov. 27, 2013, 30 pages.
United States Patent and Trademark Office, "Notice of Allowance," issued in connection with U.S. Appl. No. 12/336,338, dated Apr. 7, 2014, 7 pages.
United States Patent and Trademark Office, "Non-Final Office Action," issued in connection with U.S. Appl. No. 13/721,321, dated Apr. 1, 2013, 23 pages.
United States Patent and Trademark Office, "Final Office Action," issued in connection with U.S. Appl. No. 13/721,321, dated Nov. 1, 2013, 23 pages.
United States Patent and Trademark Office, "Notice of Allowance," issued in connection with U.S. Appl. No. 13/721,321, dated Sep. 30, 2014, 7 pages.
United States Patent and Trademark Office, "Non-Final Office Action," issued in connection with U.S. Appl. No. 13/806,820, dated Jan. 15, 2015, 5 pages.
United States Patent and Trademark Office, "Final Office Action," issued in connection with U.S. Appl. No. 14/462,190, dated Sep. 22, 2016, 22 pages.
Canadian Intellectual Property Office, "Examiner's Report," issued in connection with Canadian Patent Application No. 2,803,661, dated Aug. 5, 2016, 4 pages.
Korean Patent Office, "Notice of Allowance," issued in connection with Korean Patent Application No. 10-2013-7001922, dated Jun. 29, 2016, 2 pages.
United States Patent and Trademark Office, "Non-Final Office Action," issued in connection with U.S. Appl. No. 14/591,205, dated Jan. 25, 2016, 35 pages.
IP Australia, "Notice of Acceptance," issued in connection with Australian Patent Application No. 2010355789, dated Apr. 29, 2016, 2 pages.
United States Patent and Trademark Office, "Final Office Action," issued in connection with U.S. Appl. No. 14/591,205, dated Jul. 20, 2016, 60 pages.
United States Patent and Trademark Office, "Advisory Action," issued in connection with U.S. Appl. No. 14/591,205, dated Oct. 14, 2016, 2 pages.
United States Patent and Trademark Office, "Notice of Allowance," issued in connection with U.S. Appl. No. 14/591,205, dated Nov. 21, 2016, 39 pages.
United States Patent and Trademark Office, "Non-Final Office Action," issued in connection with U.S. Appl. No. 14/462,190, dated Aug. 25, 2017, 30 pages.

* cited by examiner

METHODS, SYSTEMS AND APPARATUS TO GENERATE MARKET SEGMENTATION DATA WITH ANONYMOUS LOCATION DATA

CROSS REFERENCE TO RELATED APPLICATION

This patent is a continuation of and claims priority to U.S. application Ser. No. 14/591,205, filed Jan. 7, 2015, entitled "Methods, Systems and Apparatus to Generate Market Segmentation Data with Anonymous Location Data," which is a continuation of and claims priority to U.S. application Ser. No. 13/721,321, filed Dec. 20, 2012, entitled "Methods, Systems and Apparatus to Generate Market Segmentation Data with Anonymous Location Data," which is a continuation of and claims priority to U.S. application Ser. No. 12/868,420, filed Aug. 25, 2010, entitled "Methods, Systems and Apparatus to Generate Market Segmentation Data with Anonymous Location Data," all of which are hereby incorporated herein by reference in their entireties.

FIELD OF THE DISCLOSURE

This disclosure relates generally to advertising, and, more particularly, to methods and apparatus to generate market segmentation data with anonymous location data.

BACKGROUND

In recent years, marketers have collected personal information from consumers to aid marketing efforts toward those and similarly situated consumers. Consumer personal information typically includes address information, telephone number information and/or zip code information. Such personal information has typically been collected by marketers through surveys, promotions and/or retailer programs associated with a retailer that provide a consumer benefit in exchange for consumer address information. Retailer programs may include consumer shopping cards (e.g., "preferred customer cards") that are barcode scanned at a checkout of the retailer to allow one or more purchased items to be discounted. Other retailer programs may include merchandise and/or cash incentives based on the amount of purchases made at the retailer store and/or retailer chain.

DETAILED DESCRIPTION

Figure 1:
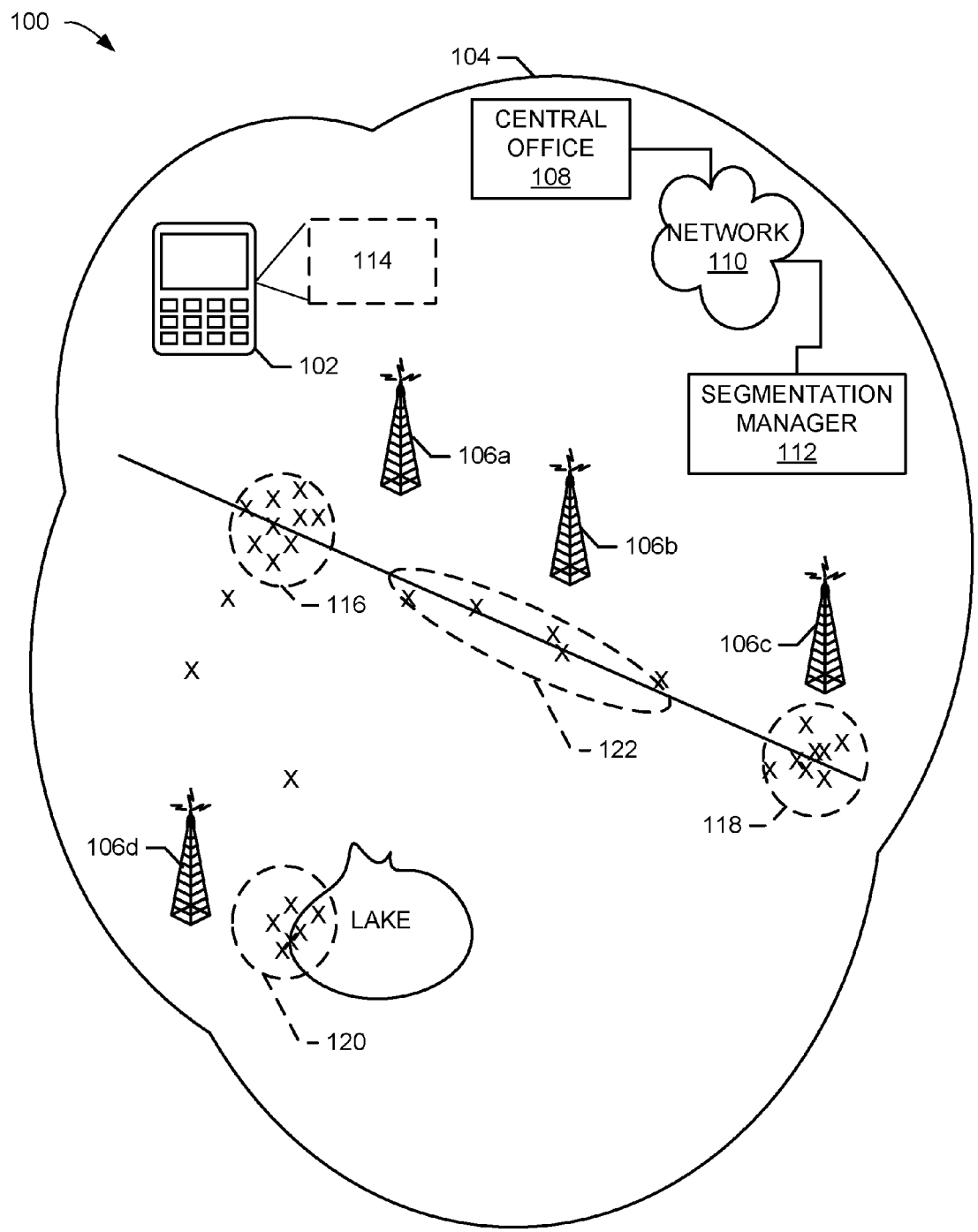
FIG. 1 is a schematic illustration of an example system to generate market segmentation data with anonymous location data.

Example methods and apparatus are disclosed to generate market segmentation data with anonymous location data. A disclosed example method involves receiving geographic location information associated with a mobile phone user, associating the geographic location information with an identifier unrelated to personal information associated with the mobile phone user, identifying a home location associated with the geographic location information, and associating segmentation information with the identifier based on the home location and without referencing personal information of the mobile phone user.

Consumers that provide personal information to a merchant, retailer, and/or marketing entity typically do so in view of a quid-pro-quo benefit. As used herein, merchants, retailers, wholesalers, manufacturers and/or marketing entities will be referred to generally as "marketers." Benefits expected and/or otherwise received by the consumers include, but are not limited to, in-store discounts, reward points, cash back, coupons, early purchase opportunities and/or marketer event information (e.g., e-mail event notifications).

The personal information provided by the consumer may include, but is not limited to, an address, a home telephone number, a wireless telephone number, demographic information, gender, income, occupation, e-mail address, etc. After the consumer provides such information, the marketers may use this information to better tailor advertisements in a manner appreciated and/or otherwise requested by the consumer. In some examples, knowledge of the consumer's demographic information and occupation allows the marketers to tailor one or more advertisements to interests the consumer is likely to have, thereby improving the overall effectiveness of the advertising campaign(s).

The marketer may employ one or more consumer segmentation service to map one or more likely market segment types to the consumer based on the consumer's disclosed home address. An example consumer segmentation system includes the Potential Rating Index for Zip Markets (PRIZM) by Nielsen®. PRIZM® provides a standardized set of characteristics, referred to as clusters, for each zip code in the United States. In some instances, PRIZM® provides characteristics for different granularities, such as block groups (e.g., greater than 10 households, but less than a zip code), ZIP+4 (e.g., approximately 10 parcels/households) and ZIP+6 (e.g., a specific address, sometimes referred to as a delivery point code). Block groups and zip+4 information may be digitally stored and reflect a polygon shape when applied to a geographic map. Each zip code (e.g., ZIP, ZIP+4, ZIP+6, block group, etc.) is associated with one or more of sixty-six (66) demographically and behaviorally distinct segments. The segment(s) associated with each household provides information indicative of likes, dislikes, lifestyles, purchase behaviors and/or media preferences. As such, marketers may utilize address information with one or more PRIZM® services to reveal an associated segment most likely associated with the provided address information, thereby allowing the marketer to more accurately tailor one or more advertisements to the associated consumer at that address.

In other examples, consumers may be reluctant to provide personal information, regardless of the quid-pro-quo benefit (e.g., discount, coupon, points, cash-back, etc.) provided by the marketer. Consumer concerns may include a lack of trust, a belief that the personal information provided to the marketer will result in nuisance activity (e.g., unwanted telephone calls (e.g., telemarketing), unwanted mail) and/or a general discomfort with sharing information that the consumer believes is personal. In still other examples, consumers may be particularly reluctant to disclose a wireless (e.g., cellular phones) telephone number for fear that one or more text messaging marketing campaigns may consume a text message quota of the consumer. As such, marketers may face challenges when attempting to market consumers via their wireless telephone.

While wireless smartphones include applications that are cost-free to the consumer based on advertisements displayed thereon, such advertisements are not tailored to specific characteristics of the consumer. In some examples, the advertisements presented to the consumer are based on their current location determined by global positioning satellite (GPS) functionality and/or cell tower location (e.g., triangulation) techniques. Advertisements based on current location information may allow the marketer to tailor advertisements related to merchants/retailers/wholesalers in the consumer's vicinity. However, such advertising efforts still fail to reflect other characteristics of the consumer (e.g., annual income, general preferred vehicle types, etc.) unless that consumer has also relinquished his/her personal information.

Example methods and apparatus described herein allow, in part, marketing information to be generated based on location information devoid of personal information. The marketing information generated by example methods and apparatus described herein is indicative of consumer characteristics and is generated without requiring the consumer to input personal information. Instead, example methods and apparatus described herein employ consumer GPS location data aggregated over a period of time to identify a likely location of the consumer's home/residence and/or a likely location of the consumer's place of employment. After determining a home location based on aggregated GPS information, the associated ZIP, block group, ZIP+4 and/or ZIP+6 is identified and provided to a market segmentation system (e.g., PRIZM®). The market segmentation system (e.g., PRIZM®) returns one or more segments that are likely associated with the home address.

As described above, PRIZM® includes sixty-six (66) segments indicative of traits/characteristics of the household member(s) associated with an address or location provided by the marketer. For example, the "Young Digerati" segment describes consumers that are the nation's tech-savvy singles and couples living in fashionable neighborhoods on an urban fringe. Such consumers are highly educated and ethnically mixed. "Young Digerati" communities are typically filled with trendy apartments and condos, fitness clubs, clothing boutiques, casual restaurants, juice bars, coffee bars and microbreweries. When the marketer learns that a consumer fits within this segment, then that marketer may better tailor one or more advertisements and/or advertising campaigns to improve advertising efficiency and/or effectiveness.

In some examples, the consumer installs an application on their wireless telephone without providing any personal information (e.g., a phone number, an address, etc.). In some examples, the application obtains an identifier, such as an international mobile equipment identity (IMEI) number from the wireless device, performs a hash on the identifier (e.g., the IMEI number) to prevent one or more opportunities to personally identify the consumer, and then captures GPS data over a period of time. The captured GPS data is associated with the hash of the identifier (e.g., the hash of the IMEI) and, thus, the user may be tracked without revealing the identity or identification information of the user. Preferably, the identifier does not permit such personal information to be derived.

While the GPS data is captured over the period of time, one or more algorithms may be executed to determine GPS coordinates that are likely associated with the user's home, the user's place of work, the user's travel route(s) and/or the user's leisure location(s). For example, one or more patterns may be identified based on GPS locations at a particular time-of-day, GPS locations near industrial areas, GPS locations near city areas, GPS locations near rural areas, GPS locations near residential areas, GPS locations near known tourist areas, etc. In the event that a number of GPS location data points are captured during hours typical of employment (e.g., between the hours of 8:00 AM and 5:00 PM during weekdays), then the GPS location data points may be associated with a work location. On the other hand, in the event that a number of GPS location data points are captured during hours associated with rest or recreation (e.g., between the hours of 5:00 PM and 8:00 AM), then the GPS location data points may be associated with a home location. Further, in the event that a number of GPS location data points are captured that form a path repeated over a number of days during times typically associated with traveling between employment and recreation sites, then the GPS location data points may be associated with a home/work traveling route. In still further examples, in the event that a number of GPS location data points are captured for a number of weekend days in areas known to be vacation destinations, then the associated GPS location data points may be associated with leisure activities for the user associated with the hashed IMEI number.

For some examples, an indication of whether a captured GPS location data point is to be associated with a home location, a work location, a travel-route location, a leisure activity location, or a vacation location may be based on, in part, the type of application that provides the GPS location data point(s) and/or the type of application(s) executing on the wireless device when the GPS location data point(s) are captured. For example, in the event that a GPS navigation application is executing on the wireless device, then one or more source locations or destination locations may be ruled out as home or work under the assumption that both home and work locations are typically known to the user. Instead, the source and/or destination locations may be associated with leisure activities. For other examples, in the event that a stock trading or financial streaming application is executing on the wireless device when the GPS location data point(s) are captured, then the user's location may be deemed to be a work location. In still further examples, in the event that a game application or a movie viewing application is executing on the wireless device when the GPS location data point(s) are captured, then the user may be deemed traveling, such as by way of car, taxi, train, etc.

Although the aforementioned examples involve an example application executing on a wireless telephone, the methods and apparatus described herein may be implemented with GPS location data points acquired from any other source(s). In some examples, GPS location data points may be acquired by a marketer via a privately maintained customer list, or data points collected from GPS devices (e.g., a car-mounted GPS navigation system). Preferably, the GPS location data points are separated from indicators that may reveal personal information associated with the users. For example, while a wireless telephone company may have abundant detail related to their customers (e.g., IMEI number, telephone number, home address, social security number, work address, work telephone number, etc.), the wireless telephone company is not likely to release and/or sell such personal information for profit due to legal privacy obligations and customer goodwill. However, the wireless telephone company may sell and/or otherwise provide innocuous identifiers (e.g., hashed IMEI numbers) having associated GPS location data points that are neither associated with personal customer data nor capable of being used to derive personal customer data.

After the captured GPS location data points have been analyzed to identify likely locations associated with a user's home, work, travel and/or leisure locations, such locations are segregated and the corresponding home location is provided to a segmentation system to identify a corresponding customer segment. As described above, the PRIZM® methodology may be used to identify one or more of sixty-six (66) customer segments associated with a zip code, a block group (e.g., block groups defined by U.S. Census data), a zip+4 (e.g., a 9-digit number associated with approximately 40 million U.S. households), a zip+6 (e.g., an 11-digit number associated with approximately 120 million households). Customer segments may include, but are not limited to "Upper Crust" (e.g., the nation's most exclusive addresses, wealthiest lifestyles), "Beltway Boomers" (e.g., household adult members of the postwar baby boom, upper-middle-class, home owners), and/or "New Empty Nests" (e.g., households where grown-up children have recently moved out, upscale older Americans that pursue active lifestyles, no interest in rest-home retirement yet over 65-years old).

The one or more likely segments are associated with the home location so that one or more marketing efforts may yield improved results to the household. For example, in the event that the user uses the application on their wireless telephone when in a store (e.g., Best Buy), the hashed IMEI number is used to identify the user's likely segment type. Based on the likely segment type, the user may be presented with advertisements, coupons and/or promotions that are tailored to that user in view of segment characteristics.

FIG. 1 is an illustration of an example system to generate market segmentation data based on anonymous location data 100. In the illustrated example of FIG. 1, the system 100 includes a wireless device 102 in a geographic area 104 capable of communicating with one or more wireless communication towers 106a, 106b, 106c, 106d. The communication towers 106a-d may be, for example, cell phone towers. While the illustrated example of FIG. 1 includes four towers 106a-d and one wireless device 102, the methods and apparatus described herein may include any number of wireless devices and antenna towers. The example wireless device 102 may be associated with a wireless provider having a central office 108 communicatively connected to one or more networks 110, such as the Internet. A segmentation manager 112 employs the one or more networks 110, wireless provider central office 108 and/or towers 106a-d to communicate with a segmentation application 114 executing on the example wireless device 102.

In operation, the example segmentation application 114 may invoke one or more functions of the wireless device 102 to capture a GPS location in a periodic, aperiodic, scheduled or manual manner. In the illustrated example of FIG. 1, each "X" indicates a GPS location captured by the segmentation application 114 over a period of time. As described above, location logic is employed to identify a home location, a work location and/or a leisure location for a user of the wireless device 102. In the illustrated example, a home location 116, a work location 118 and a leisure location 120 have been identified based on, for example, analysis of the wireless device 102 location over a period of time, time-of-day, frequency of location occurrence, known characteristics of the adjacent geography (e.g., industrial park, residential subdivision, amusement park, etc.), and/or the type(s) of applications active on the wireless device 102 when the GPS location data was captured.

One or more GPS location data points may be eliminated from consideration as the home location 116, the work location 118 or the leisure location 120 when trend analysis and/or filters are not indicative of locations where the user is either at home, at work and/or on vacation. For example, some locations are identified as commuting and/or travel locations based on reoccurring patterns of location. A home/work travel route 122 is identified based on a number of GPS location data points that occur at a similar time every work day.

Figure 2:
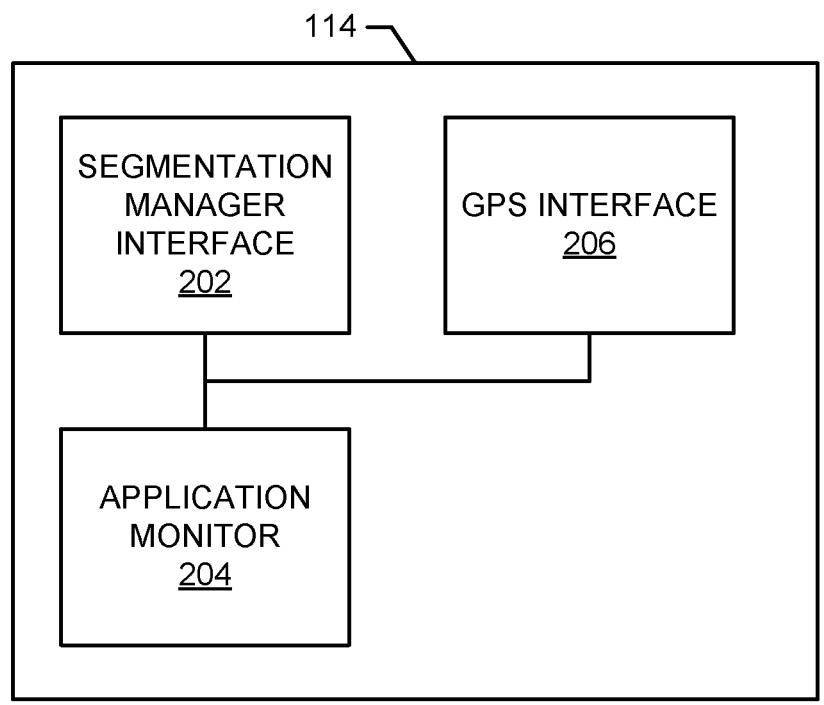
FIG. 2 is a schematic illustration of an example segmentation application that may be used in the system of FIG. 1.

FIG. 2 depicts the example segmentation application 114 of FIG. 1 in greater detail. In the illustrated example of FIG. 2, the segmentation application 114 includes a segmentation manager interface 202 to coordinate communication attempts with the example segmentation manager 112, an application monitor 204 to identify which application(s) may be executing on the example wireless device 102 at the time a GPS location data point is captured, and a GPS interface 206 to invoke location services from the wireless device 102. In operation, the segmentation manager interface 202 may operate on a periodic, aperiodic, scheduled and/or manual basis to capture GPS location data point(s). The segmentation manager interface 202 may receive a request from the example segmentation manager 112 to acquire a GPS location data point and/or the segmentation application 114 may employ a timer to acquire a GPS location data point upon periodic, aperiodic and/or scheduled times. GPS location data points captured by the example segmentation application 114 may be saved to a memory of the wireless device 102 and/or may be transmitted to the segmentation manager 112 via one or more wireless networks (e.g., via a network facilitated by a wireless service provider of the wireless device 102, via a WiFi® network in communication with the wireless device 102, etc.). The GPS data points contain time information indicative of the time of capture. This time information may be included in the GPS data or may be added and/or supplemented with time stamps.

Figure 3:
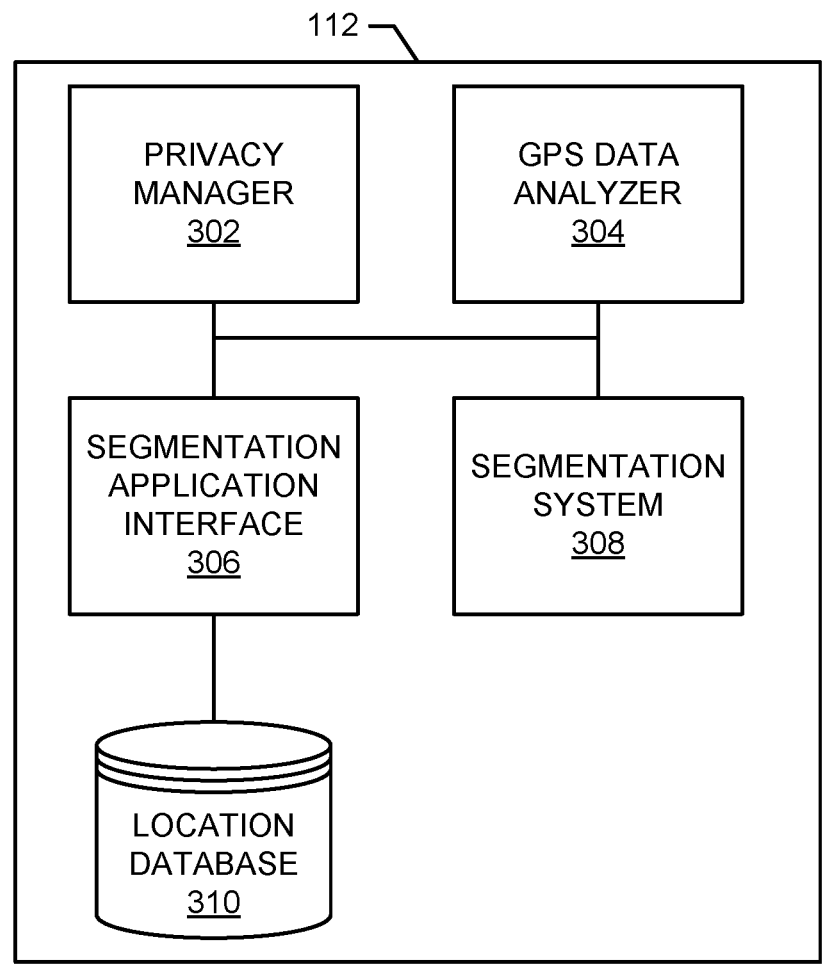
FIG. 3 is a schematic illustration of an example segmentation manager that may be used in the system of FIG. 1.

FIG. 3 depicts the example segmentation manager 112 of FIG. 1 in greater detail. In the illustrated example of FIG. 3, the segmentation manager 112 includes a privacy manager 302, a GPS data analyzer 304, a segmentation application interface 306, a segmentation system 308, and a location database 310. In operation, the privacy manager 302 receives one or more identifiers from the example segmentation application 114 via the segmentation application interface 306. Identifiers received from the segmentation application 114 may be implemented by, for example, an IMEI number, a telephone number, a user identifier, and/or any other identifier that will remain constant throughout the use of the wireless device 102. To maintain privacy for the user of the wireless device 102, the privacy manager 302 applies a one-way hash to the received identifier.

GPS location data points received by the segmentation application 114 via the segmentation application interface 306 are stored in the location database 310 and associated with the hashed value generated by the privacy manager 302. As such, the user of the wireless device 102 is never at risk of being identified, yet GPS location data points collected from the users are consistently associated with the unique hash value over time to identify one or more trends, a home location, a work location and/or a leisure location of the user of the wireless device 102. In some examples, the privacy manager 302 may be located on, or otherwise be executed by the mobile device 102, such as within the segmentation application 114.

The example GPS data analyzer 304 analyzes GPS location data points stored in the example location database 310 associated with the hashed identifier so that locations of interest can be identified, such as a home location, a work location, a leisure location and/or locations indicative of travel routes to/from home/work. As described above, logic may be employed to automatically identify locations of interest. The logic may, for example, identify the GPS location data points for a given identifier over a period of time to identify a threshold number of locations during a certain time-of-day. For example, GPS location data points repeatedly occurring in a first location at 8:00 PM every day may be indicative of a home location, while GPS location data points repeatedly occurring in a second location at 1:00 PM every day may be indicative of a work location. In still other examples, the GPS data analyzer 304 may receive the GPS location data points with an indication of other applications are executing on the wireless device 102. Such indications of applications may be used by the GPS data analyzer 304 as hints to determine whether the wireless device 102 is at a home location, a work location or one or more locations indicative of travel. In the event that the GPS data analyzer 304 identifies GPS location data points repeatedly occurring in a series of locations occurring, for example, between 8:15 AM and 8:45 AM while a crossword puzzle application is being used by the wireless device 102, then the GPS data analyzer 304 may identify such series of locations as indicative of instances of travel by the user of the wireless device 102.

After one or more locations of interest (e.g., a home location) are associated with a hashed identifier, the example segmentation system 308 matches the home location with marketing segmentation data. While the illustrated example of FIG. 3 includes the segmentation system 308 within the segmentation manager 112, it may, instead, be located external to the segmentation manager 112 and communicatively accessed via one or more networks 110, such as via the Internet. As described above, marketing segmentation data may be provided by the PRIZM® system or any other marketing segmentation system that provides an indication of consumer characteristics based on, in part, household location. For example, if the home location associated with a hashed identifier of interest is located in a segmentation identified as "Upper Crust," then one or more marketing efforts directed toward the user associated with the hashed identifier may be tailored to people generally living a wealthy lifestyle, over 55-years old and possessing a postgraduate degree.

While an example manner of implementing the system to generate market segmentation data with anonymous location data 100 of FIG. 1 has been illustrated in FIGS. 2 and 3, one or more of the elements, processes and/or devices illustrated in FIGS. 1-3 may be combined, divided, re-arranged, omitted, eliminated and/or implemented in any other way. Further, the example segmentation application 114, the example segmentation manager interface 202, the example application monitor 204, the example GPS interface 206, the example segmentation manager 112, the example privacy manager 302, the example GPS data analyzer 304, the example segmentation application interface 306, the example segmentation system 308, and/or, more generally, the example location database 310 of FIGS. 1-3 may be implemented by hardware, software, firmware and/or any combination of hardware, software and/or firmware. Thus, for example, any of the example segmentation application 114, the example segmentation manager interface 202, the example application monitor 204, the example GPS interface 206, the example segmentation manager 112, the example privacy manager 302, the example GPS data analyzer 304, the example segmentation application interface 306, the example segmentation system 308, and/or, more generally, the example location database 310 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example segmentation application 114, the example segmentation manager interface 202, the example application monitor 204, the example GPS interface 206, the example segmentation manager 112, the example privacy manager 302, the example GPS data analyzer 304, the example segmentation application interface 306, the example segmentation system 308, and/or, more generally, the example location database 310 are hereby expressly defined to include a computer readable medium such as a memory, DVD, CD, etc. storing the software and/or firmware. Further still, the example segmentation manager 112 and segmentation application 114 of FIGS. 1-3 may include one or more elements, processes and/or devices in addition to, or instead of, those illustrated in FIG. 1-3, and/or may include more than one of any or all of the illustrated elements, processes and devices.

Figure 4:
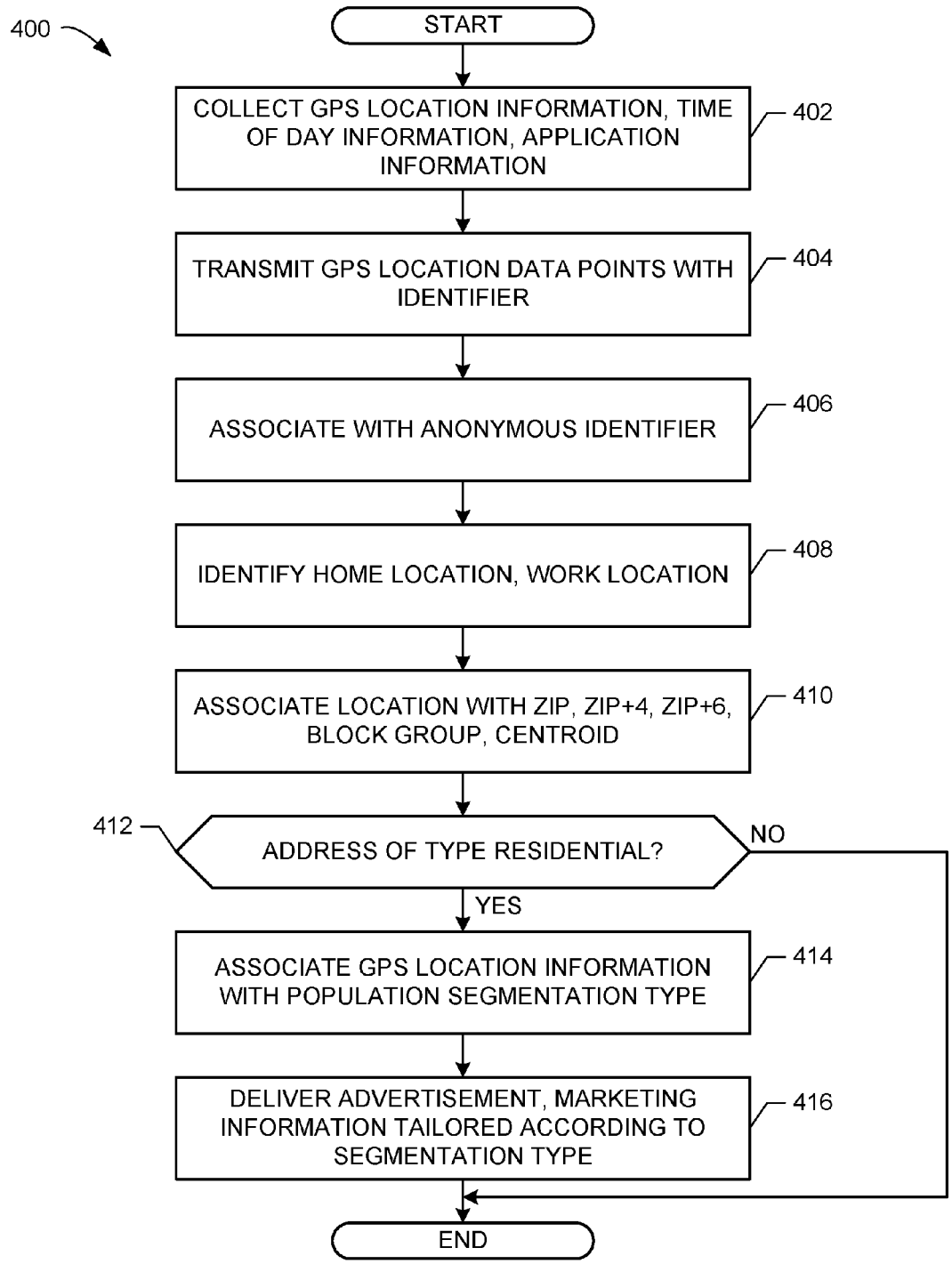
FIG. 4 is a flowchart representative of example machine readable instructions that may be executed to implement, for example, the example system shown in FIG. 1.

A flowchart representative of example machine readable instructions for implementing the segmentation manager 112 of FIGS. 1 and 3 is shown in FIG. 4. In this example, the machine readable instructions comprise a program for execution by a processor such as the processor P105 shown in the example processor platform (e.g., computer) P100 discussed below in connection with FIG. 5. The program may be embodied in software stored on a computer readable medium such as a CD-ROM, a floppy disk, a hard drive, a digital versatile disk (DVD), or a memory associated with the processor P105, but the entire program and/or parts thereof could alternatively be executed by a device other than the processor P105 and/or embodied in firmware or dedicated hardware. Further, although the example program is described with reference to the flowchart illustrated in FIG. 4, many other methods of implementing the example segmentation manager 112 and/or segmentation application 114 may alternatively be used. For example, the order of execution of the blocks may be changed, and/or some of the blocks described may be changed, eliminated, or combined.

As mentioned above, the example process of FIG. 4 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 4 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The program 400 of FIG. 4 begins at block 402 where the example segmentation manager 112 invokes the example segmentation application 114 to acquire one or more GPS location data points. The example segmentation manager interface 202 invokes the GPS interface 206 of the wireless device 102 to acquire the one or more GPS location data points. In some examples, the segmentation application 114 periodically, aperiodically, or on a scheduled basis invokes the GPS interface 206 to acquire one or more GPS location data points. GPS location data points may be stored on the wireless device 102 for a period of time and transmitted to the example segmentation manager 112 in one or more batches, or the example segmentation manager interface 202 may transmit the GPS location data points in response to each acquisition instance. As described above, the methods, apparatus and articles of manufacture described herein may operate without the wireless device 102. For instance, some examples include a list of latitude and longitude coordinates cultivated by a third party and associated with one or more identifiers that are devoid of private consumer data. However, the examples described herein will, for the sake of brevity, include the wireless device 102 as a source of the anonymous latitude and longitude data points.

The example segmentation application interface 306 receives the one or more GPS location data points from the segmentation manager interface 202, and also receives one or more identifiers from the wireless device 102 (block 404). As described above, the one or more identifiers may include, but are not limited to, one or more of an IMEI number, a phone number, and/or a user identifier. The example privacy manager 302 performs a hash on the identifier received from the wireless device 102 and associates the hash with the one or more GPS location data points (block 406) to prevent any personal consumer information from being disclosed and/or derived.

To determine which of the one or more received GPS location data points are associated with the user's home location, the example GPS data analyzer 304 analyzes the GPS location data points to identify one or more patterns indicative of home (block 408). A home location of the user of the wireless device 102 may be determined based on, for example, a threshold number of instances where the wireless device 102 is located at a first GPS location data point during a particular time of day (e.g., between midnight and 5:00 AM). The home location is associated with a corresponding zip code, a zip+4, a zip+6, a block group and/or a centroid (block 410). In some examples, the GPS location data point(s) (e.g., latitude and longitude coordinates) are translated by the example segmentation manager 112 to a zip+4 value or a zip+6 value (an address). However, in other examples, a translation to the zip+6 may not be preferred to maintain user privacy and, instead, a zip+4 value may be used. In the event the GPS location data point(s) do not directly translate to a zip+4, the segmentation manager 112 may select a centroid of a polygon of addresses closest to a zip+4 value of the polygon. If the corresponding zip code, zip+4, zip+6, block group and/or centroid is indicative of a residential area and/or residential address (block 412), then the example segmentation system 308 associates the home location with a corresponding population segmentation type (e.g., one of 66 types described above) (block 414).

One or more advertisements, marketing promotions and/or other marketing efforts are directed to the hashed identifier in a manner tailored based on the corresponding population segmentation type (block 416). For example, the example segmentation application 114 may broadcast the hashed identifier from the wireless device 102 when the user enters a retail establishment (e.g., Best Buy). The retail establishment may invoke a advertising system that, upon receiving the anonymous hashed identifier, pushes one or more advertisements, coupons and/or other marketing information to the user of the wireless device 102 in a manner tailored to their corresponding population segmentation type, thereby improving the effectiveness of the advertising attempt(s).

Figure 5:
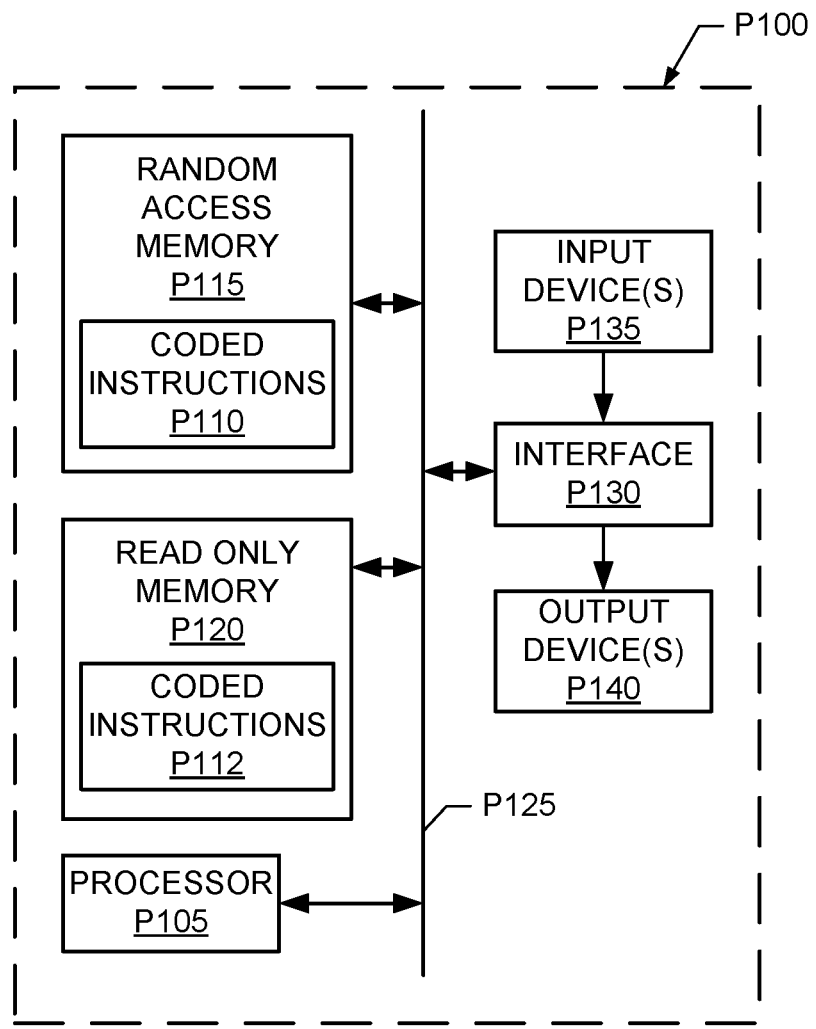
FIG. 5 is a schematic illustration of an example processor platform that may execute the instructions of FIG. 4 to implement any or all of the example methods, systems and apparatus described herein.

FIG. 5 is a schematic diagram of an example processor platform P100 that may be used and/or programmed to implement the instructions of FIG. 4 and any or all of the example segmentation application 114, the example segmentation manager interface 202, the example application monitor 204, the example GPS interface 206, the example segmentation manager 112, the example privacy manager 302, the example GPS data analyzer 304, the example segmentation application interface 306, the example segmentation system 308, and/or the example location database 310 of FIGS. 1-3. For example, the processor platform P100 can be implemented by one or more general-purpose processors, processor cores, microcontrollers, etc. The processor platform P100 can be, for example, a server, a personal computer, a mobile phone (e.g., a cell phone), an Internet appliance, or any other type of computing device.

The processor platform P100 of the example of FIG. 5 includes at least one general-purpose programmable processor P105. The processor P105 can be implemented by one or more Intel® microprocessors from the Pentium® family, the Itanium® family or the XScale® family. Of course, other processors from other families are also appropriate. The processor P105 executes coded instructions P110 and/or P112 present in main memory of the processor P100 (for example, within a RAM P115 and/or a ROM P120). The coded instructions may be, for example, the instructions implemented by FIG. 4. The processor P105 may be any type of processing unit, such as a processor core, a processor and/or a microcontroller. The processor P105 may execute, among other things, the example process of FIG. 4 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The interface circuit P130 can be implemented by, for example, a keyboard, a mouse, a touchscreen, a track-pad, a trackball, isopoint and/or a voice recognition system. The output devices P140 can be implemented, for example, by display devices (e.g., a liquid crystal display, a cathode ray tube display (CRT), a light-emitting-diode (LED) display, a printer and/or speakers).

From the foregoing, it will be appreciated that the above disclosed methods, apparatus and articles of manufacture permit consumer segmentation type identification without the use of consumer personal identification information and without such personal identification information being disclosed and/or derived, thereby maintaining consumer privacy.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A computer-implemented method to deliver tailored advertisements to a mobile device based on a consumer classification segment comprising:
    associating, by executing an instruction with a processor, a mobile device with an anonymous identifier to protect privacy of a user of the mobile device;
    determining, by executing an instruction with the processor, a first location of interest based on (a) a pattern of location data collected from the mobile device and (b) an application type of an application executing on the mobile device when the location data are collected;
    associating, by executing an instruction with the processor, the anonymous identifier with the consumer classification segment based on the first location of interest; and
    delivering, by executing an instruction with the processor, one of the tailored advertisements to the mobile device based on the consumer classification segment.

2. The method as defined in claim 1, further including applying a one-way hash to an identifier of the mobile device to produce the anonymous identifier.

3. The method as defined in claim 1, further including translating the first location of interest to form an alternate location of interest associated with the mobile device.

4. The method as defined in claim 1, further including determining a second location of interest, the second location of interest associated with a retailer, and delivering the one of the tailored advertisements associated with the retailer located at the second location of interest.

5. The method as defined in claim 1, further including identifying the pattern of location data based on a threshold number of location data points corresponding to a same location captured at a same time of day.

6. The method as defined in claim 1, further including eliminating a location from consideration as the first location of interest based on the application type.

7. A tangible computer readable medium comprising computer readable instructions that, when executed, cause a processor to, at least:
    associate a mobile device with an anonymous identifier to protect privacy of a user of the mobile device;
    determine a first location of interest based on (a) a pattern of location data collected from the mobile device and (b) an application type of an application executing on the mobile device when the location data are collected;
    associate the anonymous identifier with the consumer classification segment based on the first location of interest; and
    deliver a tailored advertisement to the mobile device based on the consumer classification segment.

8. The tangible computer readable medium as defined in claim 7, wherein the instructions, when executed, cause the processor to apply a one-way hash to an identifier of the mobile device to produce the anonymous identifier.

9. The tangible computer readable medium as defined in claim 7, wherein the instructions, when executed, cause the processor to translate the first location of interest to form an alternate location of interest associated with the mobile device.

10. The tangible computer readable medium as defined in claim 9, wherein the instructions, when executed, cause the processor to calculate a centroid location based on addresses within the pattern of location data to translate the first location of interest to form the alternate location of interest associated with the mobile device.

11. The tangible computer readable medium as defined in claim 7, wherein the instructions, when executed, cause the processor to determine a second location of interest, the second location of interest associated with a retailer, and to deliver the one of the tailored advertisements associated with the retailer located at the second location of interest.

12. The tangible computer readable medium as defined in claim 7, wherein the instructions, when executed, cause the processor to identify the pattern of location data based on a threshold number of location data points corresponding to a same location captured at a same time of day.

13. The tangible computer readable medium as defined in claim 7, wherein the instructions, when executed, cause the processor to eliminate a location from consideration as the first location of interest based on the application type.

14. A system to deliver tailored advertisements to a mobile device based on a consumer classification segment comprising:
    means for associating the mobile device with an anonymous identifier to protect privacy of a user of the mobile device;
    means for determining a first location of interest based on (a) a pattern of location data collected from the mobile device and (b) an application type of an application executing on the mobile device when the location data are collected;
    means for associating the anonymous identifier with the consumer classification segment based on the first location of interest; and
    means for delivering one of the tailored advertisements to the mobile device based on the consumer classification segment.

15. The system as defined in claim 14, further including means for applying a one-way hash to an identifier of the mobile device to produce the anonymous identifier.

16. The system as defined in claim 14, further including means for translating the first location of interest to form an alternate location of interest associated with the mobile device.

17. The system as defined in claim 16, further including means for calculating a centroid location based on addresses within the pattern of location data to translate the first location of interest to form the alternate location of interest associated with the mobile device.

18. The system as defined in claim 14, further including means for determining a second location of interest, the second location of interest associated with a retailer, and means for delivering the one of the tailored advertisements associated with the retailer located at the second location of interest.

19. The system as defined in claim 14, further including means for identifying the pattern of location data based on a threshold number of location data points corresponding to a same location captured at a same time of day.

20. The system as defined in claim 14, further including means for eliminating a location from consideration as the first location of interest based on the application type.

* * * * *